2,781,364

PREPARATION OF STEROIDS CONTAINING A 3β-HYDROXY-Δ⁵,⁶ GROUPING

Peter Ziegler and Sydney Victor Hochner, Toronto, Ontario, Canada, assignors to Canada Packers, Limited, Toronto, Ontario, Canada No Drawing. Application March 23, 1954, Serial No. 418,242

18 Claims. (Cl. 260—397.1)

This invention relates to a process for the preparation of steroids containing a 3β-hydroxy-Δ$^{5,6}$ grouping (which may be readily oxidized to the 3-keto-Δ$^{4,5}$ grouping by known procedures) and more particularly to a process for preparing these desired steroids from steroids containing a 3α,6α-dihydroxy grouping. Such steroids containing a 3β-hydroxy-Δ$^{5,6}$ grouping or the 3-keto-Δ$^{4,5}$ grouping (α,β-unsaturated keto grouping) are valuable for the production of physiologically active steroid hormones such as pregnenolone, progesterone, or testosterone or the adrenal steroids such as desoxycorticosterone or cortisone or their derivatives which contain either a 3β-hydroxy-Δ$^{5,6}$ grouping or a 3-keto-Δ4,5 grouping.

This application is a continuation-in-part of our copending application S. N. 371,178 filed July 29, 1953.

Heretofore the practical preparation of the latter mentioned types of compounds has been limited largely to the use as starting materials of steroids already containing a 3β-hydroxy-Δ$^{5,6}$ grouping such as cholesterol, sitosterol or related sterols or such sapogenins as diosgenin although beef bile acids such as cholic acid or desoxycholic acid containing 3α,7α,12α-trihydroxy groupings or 3α,12α-dihydroxy groupings respectively have been succesfully employed as starting materials in long and complicated procedures.

The major bile acid of hog bile, namely hyodesoxycholic acid which contains a 3α,6α-dihydroxy grouping has no large scale industrial uses at the present time and is available in large amounts. It has not heretofore been considered a practical starting material for the preparation of steroids containing either the 3β-hydroxy-Δ$^{5,6}$ grouping of the 3-keto-Δ$^{4,5}$ grouping since no commercially practical way was known of converting the 3α,6α-dihydroxy grouping of this compound into a 3-keto-Δ$^{4,5}$ grouping or a 3β-hydroxy-Δ$^{5,6}$ grouping.

In accordance with the present invention it has been discovered that steroids such as hyodesoxycholic acid and derivatives thereof containing a 3α,6α-dihydroxy grouping may be converted into steroids having a 3β-hydroxy-Δ$^{5,6}$ grouping by a simple procedure in which the hydroxyl group at the 6α position is removed and a double bond introduced at the 5,6 position and the 3α-hydroxyl group is replaced by a 3β-hydroxyl group. That is to say the process of the present invention is applicable to substantially any compound which contains the cyclopentanopolyhydrophenanthrene nucleus having saturated A and B rings and hydroxyl groups or groups readily convertible to hydroxyl groups at the 3α and 6α positions.

The conversion of the present invention is accomplished by reacting a steroid containing the 3α,6α-dihydroxy grouping with an aryl or alkyl sulfonyl chloride such as p-toluene-sulfonyl chloride or methanesulfonyl chloride in an organic base such as pyridine so as to convert the hydroxyl groups at the 3α and 6α positions into aryl or alkyl sulfonate groups at the same positions, for example, tosyl groups when the reagent is p-toluenesulfonyl chloride and mesyl groups when the reagent is methanesulfonyl chloride. While the para isomer has been specifically mentioned, it is to be understood that the ortho and meta isomers, which are also commercially available, could be used as well. By then reacting the resulting compounds with a metal of a lower alkanoic acid in an inert solvent for the reactants, the sulfonate group at the 6α position is completely removed and a double bond introduced at the 5,6 position while the sulfonate group at the 3α position is replaced by an acyloxy group at the 3β position, for example, an acetoxy group when the reagent is a metal salt of acetic acid.

A series of steps involving the mesylation of steroids containing a 3β,6β-dihydroxy grouping to produce a 3β,6β-dimesylate and the treatment of the resulting dimesylate with silver acetate in glacial acetic acid to produce a steroid containing a 3β-hydroxy-Δ$^{5,6}$ grouping has been suggested in the prior art. In such procedure the substitutent on the number 3 carbon atom (an acetoxy group in the resulting product) is in the 3β position originally occupied by the 3β-hydroxyl group in the starting compound, whereas in accordance with the present invention the treatment of a steroid containing a 3α,6α-dihydroxy grouping unexpectedly results in a compound in which the substituent on the number 3 carbon atom is shifted from the 3α position to the 3β position. That is to say the acyloxy group of the compound resulting from the steps of the preceding paragraph is unexpectedly in the 3β position instead of the 3α position originally occupied by the hydroxy group on the number 3 carbon atom. The 3β-acyloxy group can be easily hydrolyzed to a 3β-hydroxyl group to produce a steroid having a 3β-hydroxy-Δ$^{5,6}$ grouping which as indicated above can be readily oxidized by known procedures to produce a steroid having a 3-keto-Δ$^{4,5}$ grouping.

The importance of the section of a proper medium for the carrying out of the above mentioned reaction involving a steroid compound having sulfonate groups at the 3 and 6 positions with a metal salt of a lower alkanoic acid cannot be stressed too highly. The reactants should be brought together into one homogeneous phase and because of the widely varying properties of the steroid compound and the metal salt as to solubility and the fact that the reaction proceeds most favorably with a large excess of the metal salt over the theoretical, few reaction media result in the obtaining of commercially practicable yields. Many of the usual solvents, such as acetic acid, acetic anhydride, aqueous acetone, morpholine, isopropenyl acetate, pyridine and ethylene glycol have been tried with varying degrees of success but the results are generally unsatisfactory. In no case was there obtained a yield greater than 50% of the theoretical based on the weight of the steroid compound employed and in many instances not even a trace of the desired product could be isolated.

It has been found, and this constitutes a very important feature of the present invention, that a number of compounds belonging to the general class of amides form a satisfactory medium for carrying out the reaction. Particularly certain compounds containing the structural grouping

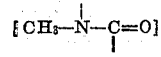

have been used with most satisfactory results. It is obvious, of course, that the compound selected should be liquid under the conditions of the reaction.

Dimethylformamide forms an excellent reaction medium. This compound is miscible with water in all proportions and it is a very simple matter to add water in an amount sufficient to dissolve the excess of metal salt present but still not enough to cause precipitation of any of the steroid compound. Employing dimethylformamide in a manner to be set forth in detail hereinafter, it is possible to obtain yields of 70–80% of the theoretical based on the steroid compound.

Other N,N-dialkyl substituted amides may be employed as the reaction medium, for example, diethylformamide and dimethylacetamide.

Another compound falling within the general class of amides and containing the grouping

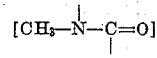

which has also consistently furnished yields between 70–80% when used as the reaction medium is N-methyl-2-pyrrolidone. N-ethyl-2-pyrrolidone and N-propyl-2-pyrrolidone may also be employed if desired.

The use of N,N-dialkyl substituted amides and N-alkyl-2-pyrrolidones as the predominant solvent in reactions employing metal salts of lower alkanoic acids to treat steroids having sulfonate groups at the 3 and 6 positions to form steroids readily convertible to steroids having a $3\beta$-hydroxy-$\Delta^{5,6}$ grouping has general application and may be utilized whether the sulfonate groups are in the $\alpha$ or $\beta$ position.

It is therefore an object of the present invention to provide a process of converting steroids having a $3\alpha,6\alpha$-dihydroxy grouping into steroids having a $3\beta$-hydroxy-$\Delta^{5,6}$ grouping, which latter steroids may either be physiologically active compounds or be readily convertible into physiologically active compounds.

Another object of the invention is to provide a process in which hyodesoxycholic acid may be readily converted into steroids having a $3\beta$-hydroxy-$\Delta^{5,6}$ grouping or a 3-keto-$\Delta^{4,5}$ grouping.

Another object of the invention is to provide a process in which steroids having alkyl or aryl sulfonate groups at the $3\alpha$ and $6\alpha$ positions are reacted with a metal salt of a lower alkanoic acid to produce steroids having a $3\beta$-acyloxy-$\Delta^{5,6}$ grouping readily converted into a $3\beta$-hydroxy-$\Delta^{5,6}$ grouping or a 3-keto-$\Delta^{4,5}$ grouping.

A further object of the invention is to provide a process in which steroids having alkyl or aryl sulfonate groups at the $3\alpha$ and $6\alpha$ positions are reacted with a metal salt of a lower alkanoic acid in a liquid N,N-dialkyl-substituted amide or an N-alkyl-2-pyrrolidone to produce increased yields of $3\beta$-acyloxy-$\Delta^{5,6}$ steroids.

A still further object of the invention is to provide a process in which a liquid N,N-dialkyl-substituted amide or an N-alkyl-2-pyrrolidone is employed as the predominant solvent to produce higher yields of the desired steroids in reactions wherein a metal salt of a lower alkanoic acid is employed to treat steroids having alkyl or aryl sulfonate groups.

Other objects and advantages of the invention will appear in the following description of the invention which will be directed primarily to the treatment of hyodesoxycholic acid and derivatives thereof although it will be understood that other steroids having a $3\alpha,6\alpha$-dihydroxy grouping can be converted into steroids having a $3\beta$-hydroxy-$\Delta^{5,6}$ grouping or a 3-keto-$\Delta^{4,5}$ grouping by the steps of the present invention.

When hyodesoxycholic acid, itself, is the starting material, it is first esterified. The alcohol employed in such esterification is not at all critical, but preferably will comprise an aliphatic alcohol having one to four carbon atoms in the molecule, although higher molecular weight alcohols, even including aryl alcohols, such as benzyl alcohol, may be used, if desired. The esterification can be carried out in any known or suitable maner to produce, for example, when methanol is used, methyl hyodesoxycholate having the following formula.

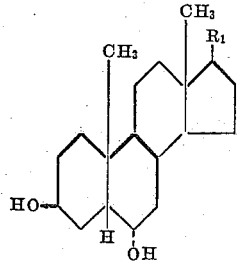
(I)

where

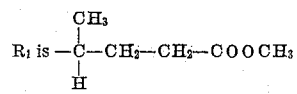

By treating the compound I with an aryl or alkyl sulfonyl chloride in an organic base such as pyridine, the hydroxyl groups in the $3\alpha,6\alpha$ positions are replaced by sulfonate groups in the same positions. For example, when methanesulfonyl chloride is employed, the resulting compound is methyl hyodesoxychlorate dimesylate having the following formula.

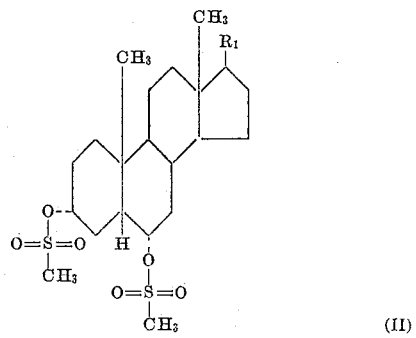
(II)

This reaction may be carried out, for example, by dissolving the methyl hyodesoxycholate (compound I) in several times its volume of pyridine and adding an excess of the sulfonyl chloride, i. e., somewhat more than 2 moles of the sulfonyl chloride per mole of the methyl hyodesoxycholate. The mixture may be allowed to stand at a temperature between 0 and 50° C. for a period ranging from approximately 10 to 60 hours. The excess sulfonyl chloride may then be decomposed by the addition of small amounts of ice or cold water. The reaction product may be obtained in approximately 95% of the theoretical yield based on the methyl hyodesoxychlorate by pouring the resulting mixture into a large volume of water acidulated, if necessary, with a mineral acid such as hydrochloric acid in sufficient amount to produce a pH below 7 and filtering off the resulting precipitate, thoroughly washing it with a dilute solution of a mineral acid in water followed by washing with water and subsequent drying and recrystallizing from a solvent for the reaction product, for example, ethyl acetate or acetone. Alternately the reaction mixture after decomposition of the excess sulfonyl chloride and dilution with acidulated water can be extracted with a water immiscible solvent for the reaction product, for example, ethylene dichloride, benzene or ether. The solvent extract can then be washed with a diluted aqueous solution of a mineral acid followed by several washings with water. Subsequent drying of the solvent extract enables recovery of the reaction product which can then be crystallized from a solvent for the reaction product. The crystallizing steps may, however, be omitted, if desired, when the product is to be reacted with a metal salt of a lower alkanoic acid in accordance with the present invention.

If an aryl sulfonyl chloride such as p-toluene-sulfonyl chloride is employed, the reaction conditions may be the same as those above described and the reaction product is methyl hyodesoxycholate ditosylate in which tosylate instead of mesylate groups are in the $\alpha$ position on the number 3 and 6 carbon atoms.

The dimesylate or ditosylate of methyl hyodesoxycholate may then be subjected to demesylation or detosylation respectively by reaction with a metal salt of a lower alkanoic acid, preferably potassium acetate, in a solvent for the reactants, the greatest yields of the desired reaction product being obtained when the solvent is a liquid N,N-dialkyl-substituted amide such as N,N-dimethyl formamide or N,N-dimethyl acetamide or an N-alkyl pyrrolidone such as N-methyl-2-pyrrolidone. In order to bring the reactants together into one homogeneous phase, a minor quantity of water is added to the selected amide. The amount of water added should be sufficient to dissolve the metal salt of the lower alkanoic acid but not so large as to cause precipitation of the steroid compound. When the metal salt is potassium acetate present in the proportion of about 10 moles per mole of steroid and the N,N-dialkyl amide is dimethylformamide, it has been found that about 8% of water based on the weight of the amide operates most satisfactorily.

In general, the reaction is carried out by dissolving the reactants in several volumes of the solvent employing a large excess of the metal salt. Approximately 10 moles of the metal salt per mole of the steroid containing the alkyl or aryl sulfonate groups is preferred but it is to be understood that a wide range in the proportion of the reactants is permissible.

The mixture is stirred for several hours at a temperature preferably within the range 100–130° C. and then diluted with a large volume of water, acid being added if necessary to produce a pH below 7. It is to be understood that the reaction would proceed to some extent outside of the above temperature range to either side but that stated has been found most satisfactory.

The resulting reaction product is obtained either as a precipitate which can be separated and washed first with a diluted solution of a mineral acid and then with water or as a gummy mass which can be taken up in a water immiscible solvent therefor such as ethylene dichloride, or ether, the resulting solvent solution being washed with a dilute aqueous solution of a mineral acid and then water followed by evaporation of the solvent. A theoretical yield of 70 to 80%, based on the steroid containing the alkyl or aryl sulfonate groups, of $3\beta$-acetoxy-$\Delta^{5,6}$ steroid is obtained when potassium acetate is the metal salt and dimethyl formamide or N-methyl-2-pyrrolidone is the solvent employed. When the metal salt of a lower alkanoic acid is an acetate the product is the methyl ester of $3\beta$-acetoxy-$\Delta^{5,6}$ cholenic acid having the following formula.

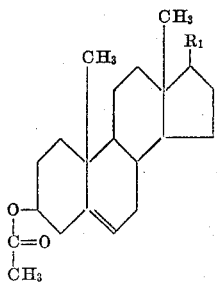

III

It is to be noted that the aryl or alkyl sulfonate group at the $6\alpha$ position and the hydrogen at the $5\beta$ position of the dimesylate (compound II) have been eliminated and that the acetoxy group on the number 3 carbon is in the $3\beta$ position whereas the alkyl or aryl sulfonate group previously on the number 3 carbon was in the $3\alpha$ position.

This product can be hydrolyzed in any known or suitable manner, for example, by treatment with methanol and potassium hydroxide followed by treatment with water and acid and extraction with a water immiscible solvent for the reaction product, for example, ethylene dichloride or ether to yield $3\beta$-hydroxy-$\Delta^{5,6}$-cholenic acid which has the following formula.

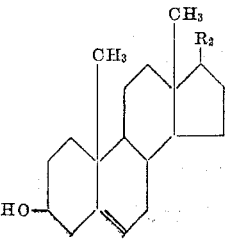

where

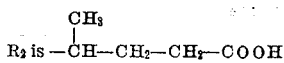

This compound can be oxidized by known methods to yield 3-keto-$\Delta^{4,5}$ cholenic acid having the following formula.

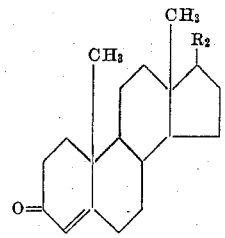

V

In the above series of reactions, the side chain was not modified, except by esterification to protect the carboxyl group thereof and de-esterification, but the side chain of any of the above compounds can be modified so that the end product of the above series of reactions and the side chain modifying reactions is a physiologically active steroid or other desired steroid.

Thus, for example, methyl hyodesoxycholate (compound I) may be reacted with the Grignard reagent phenyl magnesium bromide and the resulting product reacted with acetic anhydride to give $3\alpha,6\alpha$-diacetoxy-$\Delta^{23}$-24,24-diphenyl cholene having the following formula.

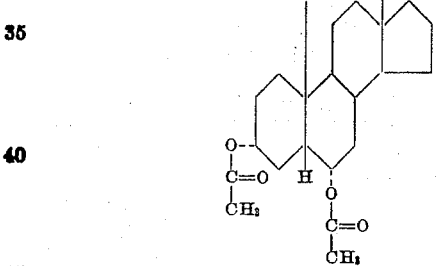

VI where

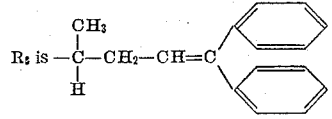

This compound may be hydrolyzed to replace the acetoxy groups with hydroxyl groups, for example, by treatment with methanolic potassium hydroxide followed by treatment with an aqueous acid solution and solvent extraction to give $3\alpha,6\alpha$-dihydroxy-$\Delta^{23}$-24,24-diphenyl cholene which differs from methyl hyodesoxycholate only in having a different side chain, i. e., the side chain $R_3$ as defined above instead of the side chain $R_1$ as defined above. Since the side chain $R_3$ is quite stable, the compound having this side chain may be subjected to the series of steps described above with respect to methyl hyodesoxycholate for converting to a $3\beta$-hydroxy-$\Delta^{5,6}$ steroid or a 3-keto-$\Delta^{4,5}$ steroid. Such steps produce compounds having the side chain $R_3$ as defined above but otherwise having the same structure as compounds IV and V respectively.

Alternatively $3\alpha,6\alpha$ - diacetoxy - $\Delta^{23}$ - 24,24 - diphenyl cholene (compound VI) may be reacted with N-bromo-succinimide to substitute a bromine atom for a hydrogen on the number 22 carbon atom and then the resulting product reacted with a base such as collidine to eliminate hydrogen bromide and produce $3\alpha,6\alpha$-diacetoxy-$\Delta^{20,23}$-24,24-diphenyl choladiene which has the same formula as compound VI except that the side chain R₃ has been changed to R₄ where

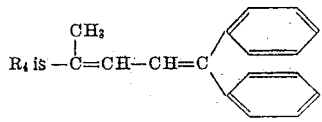

This compound can also be subjected to hydrolysis to convert the acetoxy groups at the 3α,6α positions into hydroxyl groups and the resulting compounds subjected to the series of steps applied to methyl hyodesoxycholate as described above to convert such compound into a 3β-hydroxy-Δ⁵,⁶ steroid or a 3-keto-Δ⁴,⁵ steroid. The results are compounds having R₄ as defined above as a side chain rather than R₂ as defined above but otherwise having the structure of compounds IV and V respectively.

Instead of being hydrolyzed, the 3α,6α-diacetoxy-Δ²⁰,²³-24,24-diphenyl choladiene may have its side chain oxidized, for example, with chromium trioxide to yield 3α,6α-diacetoxy pregnan-20-one which has the same formula as compound VI except that the side chain R₃ as defined above has been changed to R₅ where

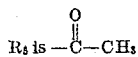

This compound can also be hydrolyzed to replace the acetoxy groups with hydroxyl groups to give 3α,6α-dihydroxy pregnan-20-one. By subjecting the latter compound to the series of steps which, as above described, may be applied to methyl hyodesoxycholate to produce a 3β-hydroxy-Δ⁵,⁶ steroid, the result is 3β-hydroxy-Δ⁵,⁶-pregnen-20-one and if the process is continued to the 3-keto-Δ⁴,⁵ steroid, the resulting compound is progesterone which has the side chain R₅ as defined above instead of the side chain R₂ as also defined above but otherwise has the same formula as compound V.

The steroid above mentioned having the 3β-hydroxy-Δ⁵,⁶ grouping and the side chain R₂ as above defined, may be esterified, for example, with methyl alcohol to produce the corresponding compound having the side chain R₁, as defined above and the resulting compound, the methyl ester of 3β-hydroxy-Δ⁵,⁶-cholenic acid, may be subjected to the above described reactions with Grignard reagent and acetic anhydride to produce the compound having the side chain R₃ as above defined instead of R₂ but otherwise the same compound as III (or IV, on hydrolysis). This is the same type of compound as is obtained when 3α,6α-diacetoxy-Δ²³-24,24-diphenyl cholene (compound VI) is subjected to hydrolysis followed by treatment with an organic sulfonyl chloride and then with the metal salt of a lower alkanoic acid as above described. The 3β-hydroxy-Δ⁵,²³-24,24-diphenyl choladiene (same as IV but with the side chain R₃) may be oxidized to the 3-keto-Δ⁴,⁵-steroid by well known procedures and the resulting compound subjected to the reaction with N-bromosuccinimide as described above to produce the 3-keto-Δ⁴,²⁰(²²),²³-24,24-diphenyl cholatriene (compound V but with side chain R₄). This compound can then be oxidized with chromium trioxide to yield progesterone (compound V but with side chain R₅).

In other words, starting with hyodesoxycholic acid, this compound may either be subjected to the above described procedure for modifying the side chain and the 3α,6α-dihydroxy grouping then converted to the 3β-hydroxy-Δ⁵,⁶-grouping (or the 3-keto-Δ⁴,⁵ by oxidation), or the order of the two procedures may be reversed, or the various steps of the two procedures may be suitably intermingled.

From the above it should be apparent that any steroid having a 3α,6α-dihydroxy grouping may be converted into a 3β-hydroxy-Δ⁵,⁶ steroid or a 3-keto-Δ⁴,⁵ steroid without modification of the side chain. If the side chain or even the steroid nucleus itself contains reactive groups, such groups can usually be protected by removeable groups so that only the desired conversion takes place. Also, even if reaction with some other portion of the steroid takes place the conversion into a 3β-hydroxy-Δ⁵,⁶ steroid or a 3-keto-Δ⁴,⁵ steroid also occurs and the conversion treatment can be employed where a reaction at some other place in the steroid is desirable or at least not deleterious.

The following examples are illustrative of the invention.

*Example 1.—Tosylation of methyl hyodesoxycholate.—* Methyl hyodesoxycholate (21.5 g.) was dissolved in dry pyridine (50 ml.) and p-toluenesulfonyl chloride (30.2 g.) was added. The solution was left standing at 20° C. for 60 hours. Then the reaction mixture was cooled, the excess reagent was decomposed by ice and the mixture acidified by the addition of a large volume of dilute hydrochloric acid. The reaction products were extracted with ethylene dichloride, the solvent extract was washed with water, dried over sodium sulfate, filtered and the solvent evaporated to dryness. The residue when crystallized from either ethyl acetate or aqueous acetone provided 34.6 g. (92% of theoretical yield based on steroid) of methyl hyodesoxycholate ditosylate, M. P. 161.5–162.5° C.

*Example 2.—Tosylation of methyl hyodesoxycholate.—* Methyl hyodesoxycholate (5 g.), dissolved in dry pyridine (15 ml.) and treated with p-toluenesulfonyl chloride (5.6 g.), was left standing at 20° C. for 24 hours. The reaction-mixture was then poured into 300 ml. of ice-cold, dilute hydrochloric acid and the granular precipitate which resulted was filtered off. It was washed with water and dried to give 8.8 g. of methyl hyodesoxycholate ditosylate, M. P. 156–158° C. This material need not be recrystallized, but can be used as such for the detosylation reaction.

*Example 3.—Detosylation of methyl hyodesoxycholate ditosylate using acetic acid and potassium acetate.—* Methyl hyodesoxycholate ditosylate (5 g.) and potassium acetate (10 g.) were dissolved in acetic acid (40 ml.) and the solution refluxed for 2½ hours. The solvent was then evaporated in vacuo, the residue was diluted with water and extracted with ether. The solvent extract, after washing with water, was dried and the residue saponified with 4% methanolic potassium hydroxide. The mixture was poured into a large colume of dilute hydrochloric acid, and the reaction product separated and crystallized from ethyl acetate to recover 810 mg. (31% of theoretical yield based on steroid) of 3β-hydroxy-Δ⁵,⁶-cholenic acid, M. P. 230–232° C.

*Example 4.—Detosylation of methyl hyodesoxycholate ditosylate using acetic acid and silver acetate.—*Methyl hyodesoxycholate ditosylate was treated as in Example 3 except that silver acetate was used instead of potassium acetate, and the process yielded 16.5% of 3β-hydroxy-Δ⁵,⁶-cholenic acid.

*Example 5.—Detosylation of methyl hyodesoxycholate ditosylate using acetic anhydride and potassium acetate.—* Potassium acetate (7.3 g.) and acetic anhydride (107 ml.) were heated to 120° C. Then methyl hyodesoxycholate ditosylate (5 g.) was added and the solution stirred at 120° C. for 15 hours. The solvent was removed in vacuo and the residue saponified with methanolic potassium hydroxide. After recovery in the same manner as in Example 3, there was obtained 1.33 g. (50% of theoretical yield based on steroid) of 3β-hydroxy-Δ⁵,⁶-cholenic acid, M. P. 222–227° C.

*Example 6.—Detosylation of methyl hyodesoxycholate ditosylate using dimethylformamide and potassium acetate.—*Potassium acetate (7.3 g.) was dissolved in N,N-dimethylformamide (40 ml.) and water (4 ml.). The solution was heated to 120° C., and methyl hyodesoxycholate ditosylate (5 g.) was added and the mixture kept at 110–120° C. for 5 hours. After cooling to 70° C., the reaction-mixture was poured into dilute hydocholoric acid and the resulting precipitate was filtered off and washed with water. The product, after saponification and treatment with water and acid and extraction with a water immiscible solvent, was crystallized from ethyl acetate to provide 1.88 g. (71.5% of theoretical yield based on steroid) of 3β-hydroxy-Δ$^{5,6}$-cholenic acid, M. P. 232–237° C.

*Example 7.—Detosylation of methyl hyodesoxycholate ditosylate using N-methyl-2-pyrrolidone and potassium acetate.*—40 ml. of N-methyl-2-pyrrolidone, 6 ml. of water, 7.3 g. of potassium acetate were warmed to 105° C. Methyl hyodesoxycholate ditosylate (5 g.) was added and the temperature maintained at 105° C. for four hours. The reaction mixture was poured into dilute hydrochloric acid and the precipitate filtered and washed until neutral. This precipitate was refluxed for two hours with 70 ml. of 4% methanolic potassium hydroxide. The reaction mixture was again poured into dilute hydrochloric acid and the precipitate filtered off. It was dissolved by refluxing in ethyl acetate. The ethyl acetate solution was filtered and evaporated to about 50 ml. After two hours in the refrigerator the crystals were filtered and washed, yielding 1.726 g., M. P. 218–223° C. A second crop was obtained weighing 0.163 g. and melting at 219–224° C. Percent yield—72.2%.

*Example 8.—Tosylation of 3α,6α-dihydroxy-Δ$^{23}$-24,24-diphenyl cholene.*—3α,6α - dihydroxy-Δ$^{23}$-24,24-diphenyl-cholene (3.5 g.) was dissolved in pyridine (15 ml.) and treated with p-toluenesulfonyl chloride (7.8 g). The solution was left standing at 20° C. for 40 hours, then cooled and the excess reagent decomposed by the addition of ice. The reaction products were then poured into dilute hydrochloric acid and extracted with chloroform. After washing of the solvent extract and drying over sodium sulfate, the solvent was removed by evaporating to leave behind a residue (5.9 g.) consisting of 3α,6α-ditosyl-Δ$^{23}$-24,24-diphenyl cholene. This non-crystalline material was subsequently detosylated without any further purification or crystallization.

*Example 9.—Preparation of 3β-hydroxy-Δ$^{5,23}$-24,24-diphenyl choladiene.*—The crude ditosylate (5 g.), obtained as described in Example 8, was detosylated by heating at 120–125° C. for 4 hours with potassium acetate (7.3 g.), dimethylformamide (40 ml.) and water (3.5 ml.). The reaction-mixture was then poured into cold, dilute hydrochloric acid, extracted with chloroform and the solvent extract washed with several portions of water. Evaporation of the solvent afforded a residue which was saponified by refluxing for 2 hours with 4% methanolic potassium hydroxide (150 ml.) and benzene (50 ml.). The saponification mixture was treated with water and acid and the reaction product extracted, using benzene as solvent for extraction. Finally there was obtained, by crystallization from acetone, 1.8 g. of 3β-hydroxy-Δ$^{5,23}$-24,24-diphenyl choladiene, M. P. 164–170° C. One further recrystallization of this material gave M. P. 176–179° C. The yield, based on the dihydroxy compound was 63% of the theoretical.

*Example 10.—Detosylation of methyl hyodesoxycholate ditosylate without isolation of the intermediate.*—A detosylation reaction was carried out in the same manner as in Example 6 except that the reaction mixture resulting from the reaction with potassium acetate in dimethylformamide was subjected to distillation in vacuo to remove the dimethylformamide and water leaving a nearly solid residue. This residue was saponified without further purification and the saponified product treated as in Example 6. The recovery of 3β-hydroxy-Δ$^{5,6}$-cholenic acid was 70% of the theoretical.

*Example 11.—Detosylation of methyl hyodesoxycholate ditosylate using dimethylformamide and sodium formate.*—Sodium formate (7.3 g.), water (15 ml.) and dimethylformamide (42 ml.) were heated to 120° C. Then methyl hyodesoxycholate ditosylate (5 g.) was added and reaction carried out as described in Example 6. After saponification and recrystallization from ethyl acetate, there was obtained 1.4 g. (55% of theoretical yield based on the steroid) of 3β-hydroxy-Δ$^{5,6}$-cholenic acid.

*Example 12.—Mesylation of methyl hyodesoxycholate.*—Methyl hyodesoxycholate (4.45 g.) was dissolved in pyridine (15 ml.) and the solution cooled to 5° C. Methanesulfonyl chloride (3.5 g.) was added and the reaction mixture left standing at room temperature for 3 hours, after which time it was poured into dilute hydrochloric acid and extracted with ethylene dichloride. The solvent extract, after washing with dilute hydrochloric acid and then water and drying over sodium sulfate, was evaporated to give a colourless residue (6.13 g.) which failed to crystallize.

*Example 13.—Demesylation of methyl hyodesoxycholate dimesylate.*—The residue (6.13 g.) obtained in Example 12 was demesylated by heating at 125° C. for 5 hours with dimethylformamide (50 ml.), water (4.5 ml.) and potassium acetate (8 g.). The reaction mixture was treated as in Example 3 to provide, after saponification and crystallization from ethyl acetate, 2.52 g. of 3β-hydroxy-Δ$^{5,6}$-cholenic acid, M. P. 225–229° C.

*Example 14.—Tosylation of 3α,6α-dihydroxy pregnan-20-one.*—3α,6α-dihydroxy pregnan-20-one (305 mg.) was dissolved in pyridine (5 ml.), p-toluenesulfonyl chloride (1.04 g.) was added and the solution allowed to remain at 20° C. for 15 hours. The reaction products were treated with ice to decompose the excess tosyl chloride, then extracted with ether. After washing, drying and evaporating the solvent extract, there remained the desired ditosylate (0.593 g.).

*Example 15.—Preparation of pregnenolone acetate.*—The residue (0.593 g.) obtained in Example 14, was added to a solution of potassium acetate (1.5 g.) in water and dimethylformamide (10 ml.), kept at 120° C. The solution was maintained at that temperature for 4 hours, then poured into dilute hydrochloric acid and extracted with ether. The solvent extract was washed, dried, and evaporated to give a residue (330 mg.) which was subsequently treated with acetic anhydride and pyridine to insure complete acetylation. The solvents were evaporated in vacuo and the residue finally chromatographed on alumina to yield 187 bg. of pregnenolone acetate, M. P. 144–146° C.

*Example 16.—Detosylation of methyl hyodesoxycholate ditosylate with potassium acetate in N,N-dimethylacetamide.*—Potassium acetate (7.3 g.), water (3.8 ml.) and dimethylacetamide (40 ml.) were heated to 105° C. Methyl hyodesoxycholate ditosylate (5 g.) was added and the reaction mixture left at 105° C. for 5 hours. The product was recovered as described in Example 6 to provide 1.76 g. of 3β-hydroxy-Δ$^{5,6}$-cholenic acid, M. P. 225–230° C.

*Example 17.—Tosylation of 3α,6α-dihydroxy-Δ$^{20,23}$-24,24 - diphenyl choladiene.* — 3α,6α - dihydroxy - Δ$^{20,23}$-24,24-diphenyl choladiene (5.0 g.) in pyridine (15 ml.) was treated with tosyl chloride (4.5 g.) and the solution kept at 20° C. for 48 hours. The reaction mixture was then cooled, the excess tosyl chloride was decomposed by addition of a small amount of ice, the mixture was poured into dilute mineral acid and extracted with chloroform. The solvent extract was washed, dried and evaporated in vacuo to provide a residue (8.15 g.).

*Example 18.—Preparation of 3β-hydroxy-24,24-diphenyl-Δ$^{5,20,23}$-cholatriene.*—The residue (8.15 g.) from Example 17 was detosylated by stirring at 100–105° C. for 5 hours with a solution of potassium acetate (9.8 g.) in diimethylformamide (60 ml.) and water (5.2 ml.). The solution was subsequently poured into a mixture of ice and hydrochloric acid, the resulting precipitate was filtered off, washed with water and dried. After saponification with methanolic potassium hydroxide and benzene, extraction of the reaction product with ether and working up of the solvent extract in the usual manner, the residue was crystallized from ethanol to provide 3.85 g. of material, M. P. 130–137° C. One recrystallization from hexane and one from ethanol finally gave 2.84 g. (60%) of 3β-hydroxy-24,24-diphenyl-Δ[5,20,23]-cholatriene, M. P. 157–162° C.

In general the recovery of the desired 3β-hydroxy-Δ[5,6] steroid is much greater when a N,N-dialkyl substituted amide or an N-alkyl-2-pyrrolidone is employed as the solvent in the detosylation or demesylation reaction, or similar reaction for removing and replacing sulfonate groups, than when some other solvent such as acetic acid or acetic anhydride is employed as the solvent. N,N-dimethyl formamide is a preferred solvent since it gives higher yields and is commercially available in large quantities. N,N-dimethyl acetamide is also available commercially and can be employed, also with good results. Other N,N-dialkyl substituted amides of the general formula

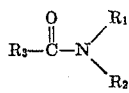

where $R_1$, $R_2$ and $R_3$ are alkyl groups containing from one to three carbon atoms are also suitable as the reaction medium for the reaction between a metal salt of a lower alkanoic acid and a steroid having organic sulfonate groups attached to its nucleus with the limitation that the amide must be liquid under the operating conditions of the reaction.

N-alkyl-2-pyrrolidones of the general formula

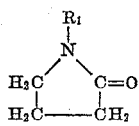

where $R_1$ is an alkyl group containing from one to three carbon atoms may also be employed as reaction media. N-methyl-2-pyrrolidone is preferred and its use results in the attainment of excellent yields.

These media, when employed with a small amount of water, dissolve both the steroids and the metal salt in a liquid system which does not separate into two phases and in general the employment of such solvents produces much higher yields than other solvents.

The highest yields of the desired 3β-hydroxy-Δ[5,6] steroids have also been obtained when potassium acetate is the metal salt reacted with a steroid having alkyl or aryl sulfonate groups in the 3α,6α positions. However, substantial yields can be obtained with the salt of substantially any metal and a lower alkanoic acid having one to three carbon atoms. Thus the formates, acetates and propionates of such different metals as potassium, sodium, lithium, silver, zinc, tin or calcium can be employed.

As to the alkyl or aryl sulfonyl chloride, the alkyl or aryl radical can be substantially any hydrocarbon radical, i. e., the sulfonyl chloride of any aliphatic or aromatic hydrocarbon which has been successfully converted into a sulfonyl chloride can be employed. In fact the radical can be any organic radical which is stable in the reaction so as to not produce side reactions. Methanesulfonylchloride and p-toluenesulfonyl chloride were selected for the examples because they are commercially available and illustrate sulfonyl chlorides having two diverse types of organic radical. The organic base employed as the solvent in the reaction of the 3α,6α-dihydroxy steroid with the sulfonyl chloride is preferably pyridine because of its availability and stability but other organic bases such as collidine, picoline, quinoline, etc., may be employed.

The mineral acids employed in the various steps of the processes to adjust pH during recovery of a reaction product may be substantially any strong mineral acid such as hydrochloric, sulfuric or phosphoric, i. e., any strong mineral acid which is no more oxidizing than sulfuric acid, hydrochloric acid usually being preferred.

Steroids in general are soluble in many organic solvents and any one of a large number of such solvents can be employed for recrystallization of steroids in purification processes as is well known to the art. Such solvents, as also known to the art, may also be employed for extracting the various steroids from water if the solvents are also immiscible with the water.

What is claimed is:

1. In a method of preparing a steroid having a 3β-hydroxy-Δ[5,6] grouping from a steroid having a 3α,6α-dihydroxy grouping and having the following structural formula:

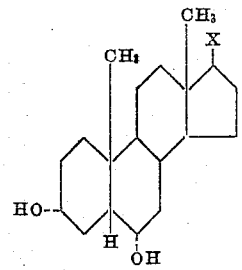

wherein X is selected from the group consisting of

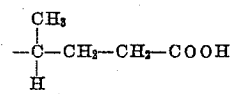

esterified with an alcohol selected from the group consisting of the aliphatic alcohols having from one to four carbon atoms in the molecule and benzyl alcohol,

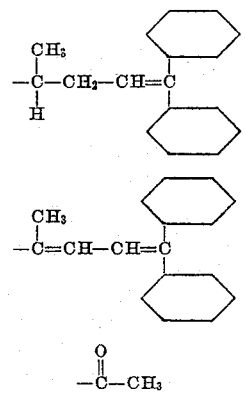

and the steps which comprise, reacting the latter mentioned steroid with an organic sulfonyl chloride to replace the hydroxyl groups at the 3α and 6α positions with sulfonate groups at the 3α and 6α positions, and thereafter reacting the resulting compound with a metal salt of a lower alkanoic acid in a reaction medium comprising an organic compound selected from the group consisting of the di-lower alkyl substituted lower alkanoic carboxylic acid amides and the lower alkyl substituted pyrrolidones liquid under the conditions of the reaction and a small amount of water, to replace the sulfonate group at the 3α position with an acyloxy group at the 3β position and eliminate the sulfonate group at the 6α position while introducing a double bond between the numbers 5 and 6 carbon atoms of the resulting steroid.

2. In a method of preparing a steroid having a 3β-hydroxy-Δ[5,6] grouping from a steroid having a 3α,6α-dihydroxy grouping and having the following structural formula:

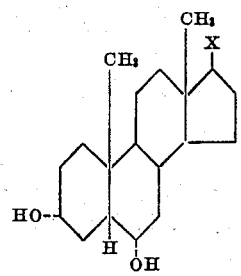

wherein X is selected from the group consisting of

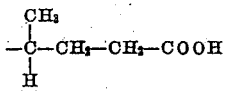

esterified with an alcohol selected from the group consisting of the aliphatic alcohols having from one to four carbon atoms in the molecule and benzyl alcohol,

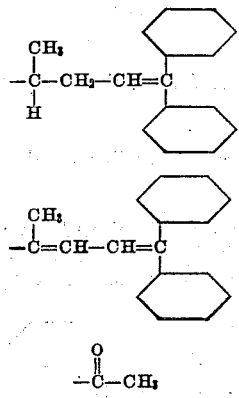

and the steps which comprise, reacting the latter mentioned steroid with an organic sulfonyl chloride to replace the hydroxyl groups at the 3α and 6α positions with sulfonate groups at the 3α and 6α positions, thereafter reacting the resulting compound with a metal salt of a lower alkanoic acid in a reaction medium comprising an organic solvent selected from the group consisting of the di-lower alkyl substituted lower alkanoic carboxylic acid amides and the lower alkyl substituted pyrrolidones to replace the sulfonate group at the 3α position with an acyloxy group at the 3β position and eliminate the sulfonate group at the 6α position while introducing a double bond between the numbers 5 and 6 carbon atoms of the resulting steroid and hydrolyzing the resulting compound to replace the acyloxy group at the 3β position with a hydroxyl group at the 3β position.

3. In a method of preparing a steroid having a 3β-hydroxy-Δ⁵,⁶ grouping from a steroid having a 3α,6α-dihydroxy grouping and having the following structural formula:

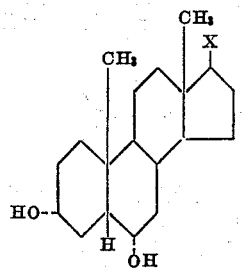

wherein X is selected from the group consisting of

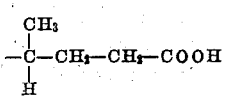

esterified with an alcohol selected from the group consisting of the aliphatic alcohols having from one to four carbon atoms in the molecule and benzyl alcohol,

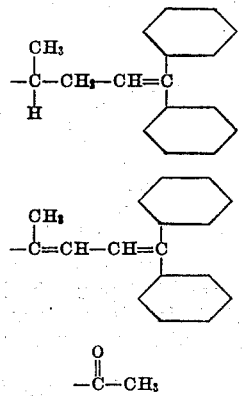

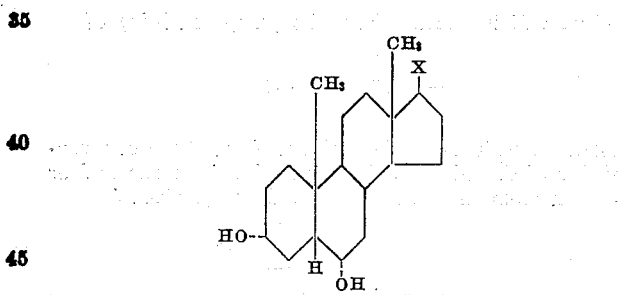

and wherein said last mentioned steroid is treated to convert the hydroxy groups to organic sulfonate groups having the same configuration, the step which comprises, reacting said steroid having organic sulfonate groups at the 3α,6α positions with a metal salt of lower alkonic acid having from one to three carbon atoms in a reaction medium liquid under the conditions of the reaction comprising a compound selected from the group consisting of the di-lower alkyl substituted lower alkanoic carboxylic acid amides and the lower alkyl substituted pyrrolidones.

4. In a method of preparing a steroid having a 3β-hydroxy-Δ⁵,⁶ grouping from a steroid having a 3α,6α-dihydroxy grouping and having the following structural formula:

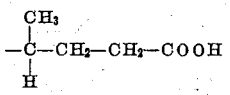

wherein X is selected from the group consisting of

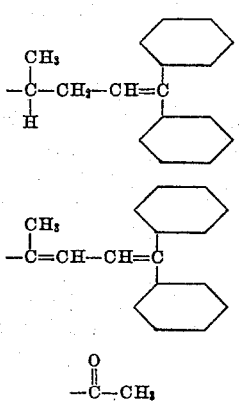

esterified with an alcohol selected from the group consisting of the aliphatic alcohols having from one to four carbon atoms in the molecule and benzyl alcohol, and wherein said last mentioned steroid is treated to convert the hydroxy groups to organic sulfonate groups having the same configuration, the step which comprises, reacting said steroid having organic sulfonate groups at the 3α, 6α positions with a metal salt of a lower alkanoic acid having from one to three carbon atoms in a reaction medium liquid under the conditions of the reaction comprising an organic compound selected from the group consisting of:

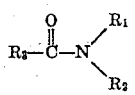

and

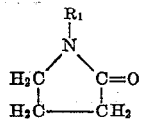

where $R_1$ and $R_2$ are alkyl groups having from 1 to 3 carbon atoms and $R_3$ is selected from the group consisting of hydrogen and alkyl groups containing from 1 to 3 carbon atoms.

5. In a method of preparing a steroid having a 3β-hydroxy-$\Delta^{5,6}$ grouping from a steroid having a 3α,6α-dihydroxy grouping and having the following structural formula:

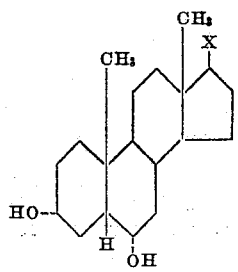

wherein X is selected from the group consisting of

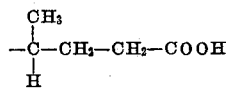

esterified with an alcohol selected from the group consisting of the aliphatic alcohols having from one to four carbon atoms in the molecule and benzyl alcohol,

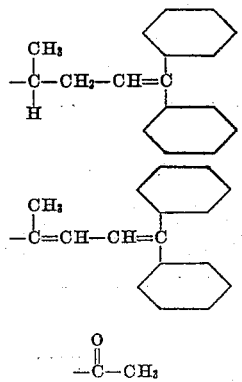

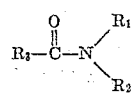

and the steps which comprise, reacting the latter mentioned steroid with an organic sulfonyl chloride selected from the group consisting of methanesulfonyl chloride and p-toluenesulfonyl chloride in an organic base as a solvent to replace the hydroxyl groups at the 3α and 6α positions with sulfonate groups at the 3α and 6α positions, and thereafter reacting the resulting compound with a metal salt of a lower alkanoic acid having from 1 to 3 carbon atoms in a reaction medium comprising an organic compound having the formula

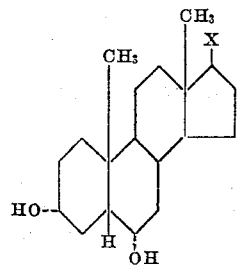

where $R_1$ and $R_2$ are alkyl groups having from 1 to 3 carbon atoms and $R_3$ is selected from the group consisting of hydrogen and alkyl groups containing from 1 to 3 carbon atoms, said reaction medium containing sufficient water to dissolve said metal salt but not enough water to precipitate said latter mentioned steroid, to replace the sulfonate group at the 3α position with an acyloxy group at the 3β position and eliminate the sulfonate group at the 6α position while introducing a double bond between the numbers 5 and 6 carbon atoms of the resulting steroid.

6. In a method of preparing a steroid having a 3β-hydroxy-$\Delta^{5,6}$ grouping from a steroid having a 3α,6α-dihydroxy grouping and having the following structural formula:

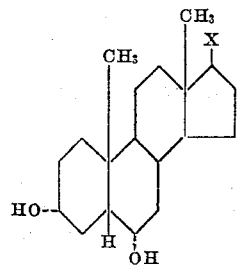

wherein X is selected from the group consisting of

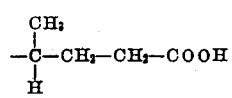

esterified with an alcohol selected from the group consisting of the aliphatic alcohols having from one to four carbon atoms in the molecule and benzyl alcohol,

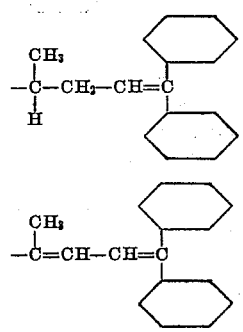

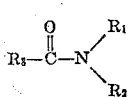

and the steps which comprise, reacting the latter mentioned steroid with methanesulfonyl chloride in pyridine as a solvent to replace the hydroxy groups at the 3α and 6α positions with mesyl groups at the 3α and 6α positions and then reacting the resulting mesylated steroid with potassium acetate in a reaction medium containing approximately 8% of water based on the weight of the reaction medium, said reaction medium having the formula

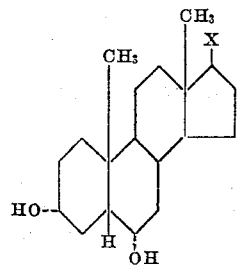

where $R_1$ and $R_2$ are alkyl groups having 1 to 3 carbon atoms and $R_3$ is selected from the group consisting of hydrogen and alkyl groups containing from 1 to 3 carbon atoms, to replace the mesyl group at the 3α position with an acetoxy group at the 3β position and remove the mesyl group at the 6α position while introducing a double bond between the numbers 5 and 6 carbon atoms.

7. In a method of preparing a steroid having a 3β-hydroxy-$\Delta^{5,6}$ grouping from a steriod having a 3α,6α-dihydroxy grouping and having the following structural formula:

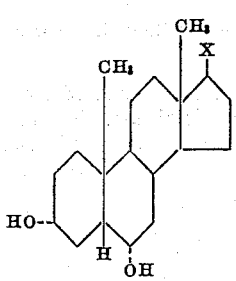

wherein X is selected from the group consisting of

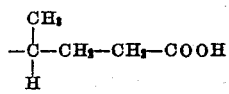

esterified with an alcohol selected from the group consisting of the aliphatic alcohols having from one to four carbon atoms in the molecule and benzyl alcohol,

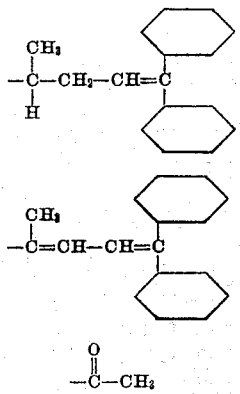

and the steps which comprise, reacting the latter mentioned steroid with a toluenesulfonylchloride in pyridine as a solvent to replace the hydroxy groups at the $3\alpha$ and $6\alpha$ positions with tosyl groups at the $3\alpha$ and $6\alpha$ positions and then reacting the resulting tosylated steroid with potassium acetate in a reaction medium containing approximately 8% of water based on the weight of the reaction medium, said reaction medium having the formula

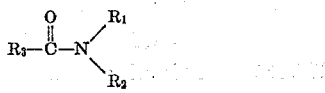

where $R_1$ and $R_2$ are alkyl groups having 1 to 3 carbon atoms and $R_3$ is selected from the group consisting of hydrogen and alkyl groups containing from 1 to 3 carbon atoms, to replace the tosyl group at the $3\alpha$ position with an acetoxy group at the $3\beta$ position and remove the tosyl group at the $6\alpha$ position while introducing a double bond between the numbers 5 and 6 carbon atoms.

8. In a method of preparing a steroid having a $3\beta$-hydroxy-$\Delta^{5,6}$ grouping from a steroid having a $3\alpha,6\alpha$-dihydroxy grouping and having the following structural forfula:

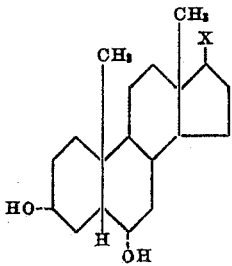

wherein X is selected from the group consisting of

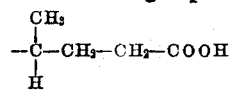

esterified with an alcohol selected from the group consisting of the aliphatic alcohols having from one to four carbon atoms in the molecule and benzyl alcohol,

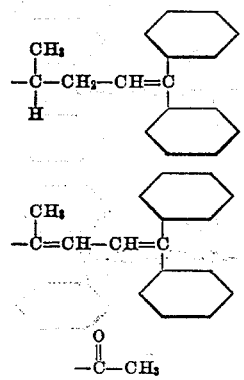

and wherein said last mentioned steroid is treated to convert the hydroxy groups to organic sulfonate groups having the same configuration, the step which comprises, reacting said steroid having organic sulfonate groups at the $3\alpha,6\alpha$ positions with a metal salt of a lower alkanoic acid having from 1 to 3 carbon atoms in a reaction medium having the formula

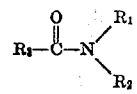

where $R_1$ and $R_2$ are alkyl groups containing from 1 to 3 carbon atoms and $R_3$ is selected from the group consisting of hydrogen and alkyl groups containing from 1 to 3 carbon atoms, said reaction medium containing approximately 8% of water based on the weight of the reaction medium, to replace the sulfonate group at the $3\alpha$ position with an acyloxy group in the $3\beta$ position and eliminate the sulfonate group at the $6\alpha$ position while introducing a double bond between the numbers 5 and 6 carbon atoms.

9. The method as defined in claim 8 in which the reaction medium is N,N-dimethylformamide.

10. The method as defined in claim 9 in which the organic sulfonate groups are mesyl groups and the salt of a lower alkanoic acid is potassium acetate.

11. The method as defined in claim 9 in which the organic sulfonate groups are tosyl groups and the salt of a lower alkanoic acid is potassium acetate.

12. The method as defined in claim 8 in which the reaction medium is N,N-dimethylacetamide.

13. The method as defined in claim 12 in which the organic sulfonate groups are mesyl groups and the salt of a lower alkanoic acid is potassium acetate.

14. The method as defined in claim 12 in which the organic sulfonate groups are tosyl groups and the salt of a lower alkanoic acid is potassium acetate.

15. In a method of preparing a steroid having a $3\beta$-hydroxy-$\Delta^{5,6}$ grouping from a steroid having a $3\alpha,6\alpha$-dihydroxy grouping, and having the following structural formula:

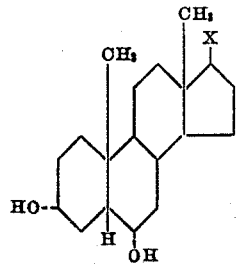

wherein X is selected from the group consisting of

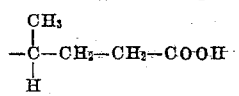

esterified with an alcohol selected from the group consisting of the aliphatic alcohols having from one to four carbon atoms in the molecule and benzyl alcohol,

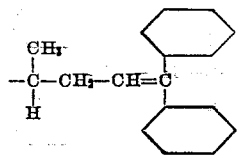

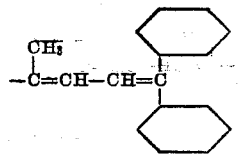

and wherein said last mentioned steroid is treated to convert the hydroxy groups to organic sulfonate groups having the same configuration, the step which comprises, reacting said steroid having organic sulfonate groups at the 3α,6α positions with a metal salt of a lower alkanoic acid having from 1 to 3 carbon atoms in a reaction medium having the formula

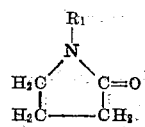

where $R_1$ is an alkyl group having from 1 to 3 carbon atoms, said reaction medium containing sufficient water that said steroid and said metal salt exist in one homogeneous phase in said reaction medium, to replace the sulfonate group at the 3α position with an acyloxy group in the 3β position and eliminate the sulfonate group at the 6α position while introducing a double bond between the number 5 and 6 carbon atoms.

16. The method as defined in claim 15 in which said reaction medium comprises N-methyl-2-pyrrolidone.

17. In a method of preparing a steroid having a 3β-hydroxy-$\Delta^{5,6}$ grouping from a steroid having a 3,6-dihydroxy grouping and having the following structural formula:

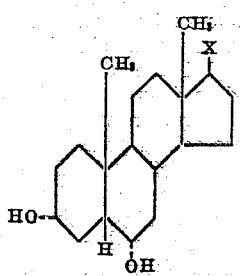

wherein X is selected from the group consisting of

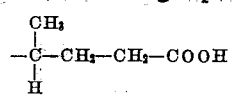

esterified with an alcohol selected from the group consisting of the aliphatic alcohols having from one to four carbon atoms in the molecule and benzyl alcohol,

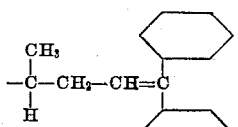

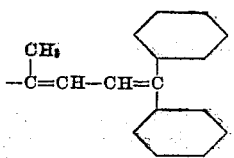

and wherein said last mentioned steroid is treated to convert the hydroxy groups to organic sulfonate groups having the same configuration, the step of reacting the steroid containing said organic sulfonate groups with a metal salt of a lower alkanoic acid in an inert reaction medium comprising predominantly an organic solvent selected from the group consisting of the di-lower alkyl substituted lower alkanoic carboxylic acid amides and the lower alkyl substituted pyrrolidones liquid under the conditions of the reaction and a minor proportion of water sufficient to dissolve said metal salt but not sufficient to precipitate the steroid, to replace the sulfonate group at the 3 position with an acyloxy group at the same position and eliminate the sulfonate group at the 6 position while introducing a double bond between the numbers 5 and 6 carbon atoms of the resulting steroid, said resulting steroid being readily convertible to said steroid having a 3β-hydroxy-$\Delta^{5,6}$ grouping.

18. The method as defined in claim 17 in which the organic solvent is dimethylformamide.

References Cited in the file of this patent

UNITED STATES PATENTS 2,520,656     Reichstein             Aug. 29, 1950

FOREIGN PATENTS 287,862      Switzerland            Apr. 16, 1953